(12) United States Patent
Rhoades

(10) Patent No.: US 8,464,607 B2
(45) Date of Patent: Jun. 18, 2013

(54) CYLINDER WITH REPLACEABLE ATTACHMENT MEMBER

(75) Inventor: Todd K. Rhoades, New Bremen, OH (US)

(73) Assignee: Parker Hannifin Corporation, Cleveland, OH (US)

( * ) Notice: Subject to any disclaimer, the term of this patent is extended or adjusted under 35 U.S.C. 154(b) by 875 days.

(21) Appl. No.: 12/582,900

(22) Filed: Oct. 21, 2009

(65) Prior Publication Data

US 2010/0095839 A1    Apr. 22, 2010

Related U.S. Application Data

(60) Provisional application No. 61/107,060, filed on Oct. 21, 2008.

(51) Int. Cl.
*F16J 1/12* (2006.01)
*F15B 15/14* (2006.01)

(52) U.S. Cl.
CPC .............. *F15B 15/1457* (2013.01); *F16J 1/12* (2013.01)
USPC .............. 74/579 R; 92/128; 92/118; 92/13.5; 92/169.1; 91/61; 91/488; 123/197.1

(58) Field of Classification Search
USPC .......... 92/128, 118, 119, 169.1, 13.5; 269/32; 251/25; 74/579 R, 579 E; 91/61, 488
See application file for complete search history.

(56) References Cited

U.S. PATENT DOCUMENTS

| 391,148 | A | | 10/1888 | Humble | |
|---|---|---|---|---|---|
| 1,602,059 | A | | 10/1926 | Wert | |
| 3,319,575 | A | * | 5/1967 | Havens | 91/488 |
| 3,913,883 | A | * | 10/1975 | Irwin | 251/25 |
| 4,056,173 | A | | 11/1977 | Farr | |
| 4,770,058 | A | | 9/1988 | Lilie et al. | |
| 4,802,382 | A | | 2/1989 | Nissels | |

(Continued)

FOREIGN PATENT DOCUMENTS

| FR | 2829544 A1 | 3/2003 |
|---|---|---|
| WO | 9218781 A1 | 10/1992 |
| WO | 03037626 A1 | 5/2003 |
| WO | 2007123301 A2 | 11/2007 |

OTHER PUBLICATIONS

Parket Hannifin Corp., Cylinder Division, Compact Hydraulic Cylinders Series CHE/CHD, Catalog HY08-1137-3/NA, Aug. 2008.*

(Continued)

*Primary Examiner* — Vinh Luong
(74) *Attorney, Agent, or Firm* — Renner, Otto, Boisselle & Sklar, LLP

(57) ABSTRACT

A cylinder includes a cylinder body defining a cylinder bore. End caps close opposite ends of the cylinder body. A piston/rod assembly of the cylinder includes a piston portion and a rod portion. The piston portion is located in the cylinder bore and the rod portion extends outwardly of the cylinder body through at least one of the end caps and terminates at an end having a first interlocking member. The cylinder also includes an attachment member having opposite first and second ends. The first end of the attachment member has a second interlocking member for cooperating with the first interlocking member for attaching the attachment member to the end of the rod portion. The second end of the attachment member includes a mating feature for connecting the attachment member and thus, the rod portion to another part.

12 Claims, 2 Drawing Sheets

U.S. PATENT DOCUMENTS

| | | | |
|---|---|---|---|
| 4,909,130 A * | 3/1990 | LaBair ............................ 92/128 |
| 4,930,405 A | 6/1990 | Lilie |
| 5,046,706 A * | 9/1991 | McNamara et al. ............ 269/32 |
| 5,054,372 A * | 10/1991 | Weyer ............................ 92/13.5 |
| 5,129,311 A * | 7/1992 | Hart ................................ 92/5 R |
| 5,671,655 A | 9/1997 | Vollrath |
| 5,765,428 A * | 6/1998 | Lallier ............................ 72/325 |
| 5,885,000 A | 3/1999 | Miyahara et al. |
| 5,904,089 A * | 5/1999 | Jansson et al. .................. 92/118 |
| 5,960,693 A * | 10/1999 | Yuda, Jr. ......................... 91/61 |
| 6,551,067 B1 | 4/2003 | Vollrath et al. |
| 7,654,189 B2 * | 2/2010 | Kohlmeyer et al. ......... 92/169.1 |
| 2002/0175034 A1 | 11/2002 | Sander et al. |
| 2002/0189570 A1 | 12/2002 | Kaesgen |

OTHER PUBLICATIONS

Parker Hannifin Corporation, Cylinder Division, Compact Hydraulic Cylinders Series CHE/CHD, p. 6, Catalog HY08-1137-3/NA, 2008, Des Plaines, IL, USA.

* cited by examiner

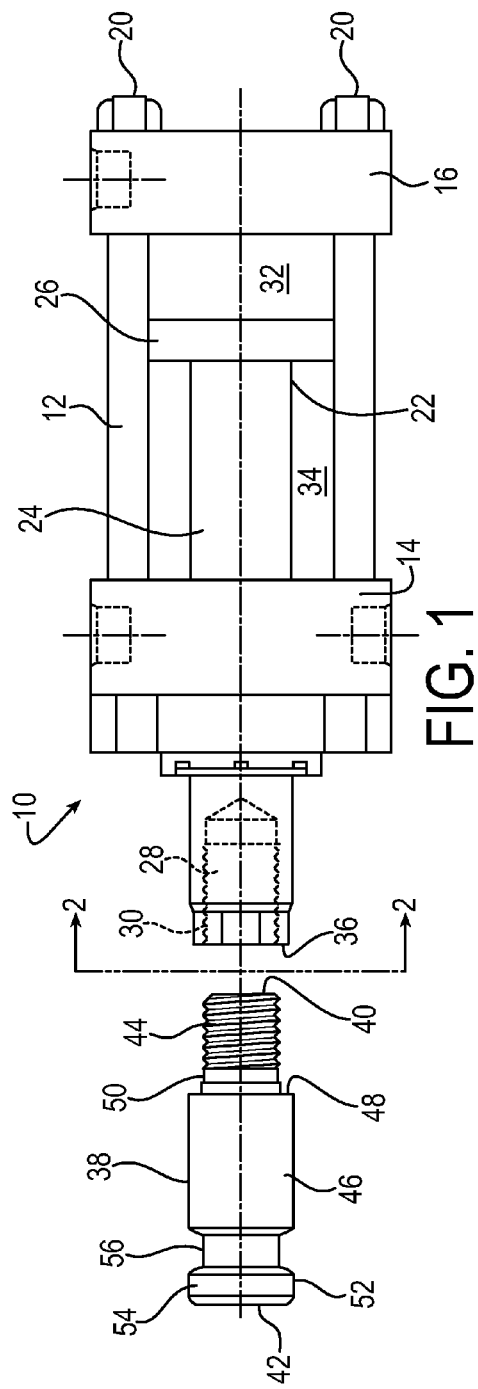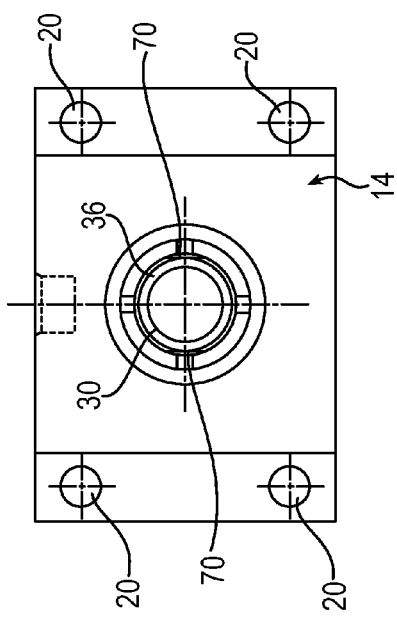

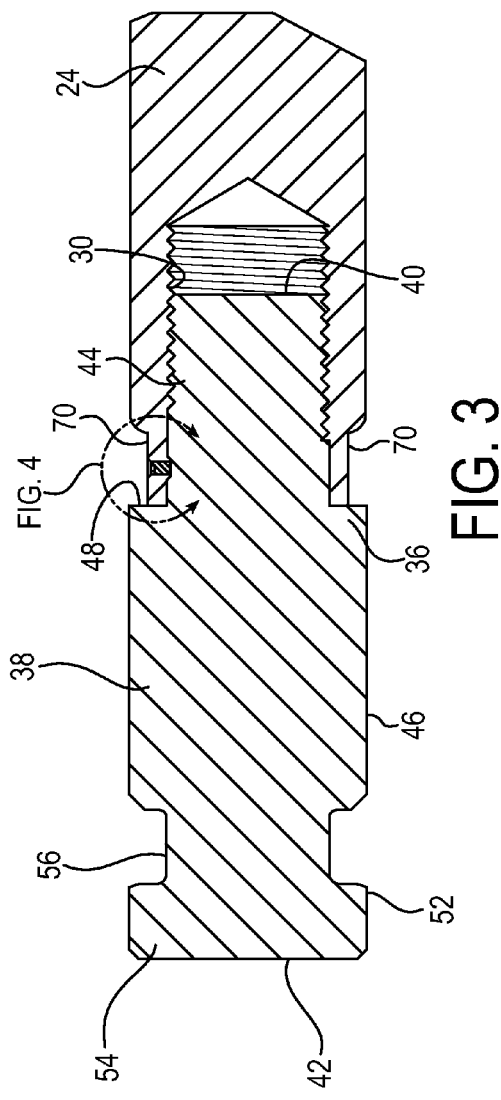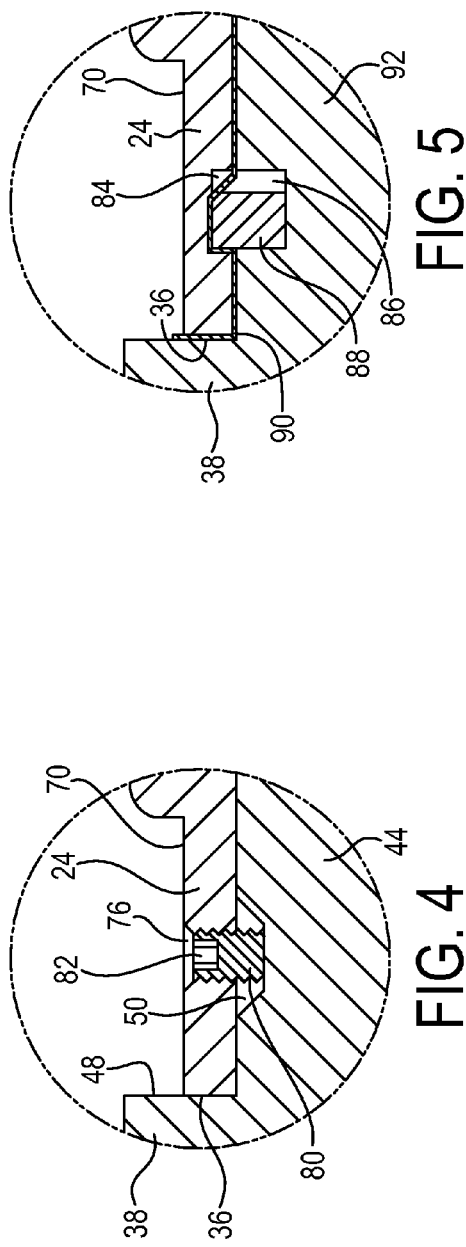

CYLINDER WITH REPLACEABLE ATTACHMENT MEMBER

CROSS REFERENCE TO RELATED APPLICATIONS

The present application claims the benefit of the filing date of U.S. Provisional Patent Application Ser. No. 61/107,060, filed Oct. 21, 2008, the disclosure of which is incorporated herein by reference in its entirety.

TECHNICAL FIELD

This invention relates to a cylinder and, more particularly, relates to a cylinder having a piston/rod assembly and a replaceable attachment member.

BACKGROUND OF THE INVENTION

Cylinders, such as hydraulic or pneumatic cylinders, include a cylinder body and a piston/rod assembly. The cylinder body defines a bore in which a piston portion of the piston/rod assembly is located. The piston portion divides the bore into first and second variable volume fluid chambers. A rod portion of the piston/rod assembly extends from the piston portion, through at least one of the first and second chambers and out of the cylinder body. Generally, a sealing assembly is located on an end cap of the cylinder body for sealing against the rod portion as the rod portion exits the cylinder body. The rod portion of the piston/rod assembly moves with the movement of the piston/rod assembly.

The end of the rod portion of the piston/rod assembly located outside of the cylinder body often is attached to another part or structure. For attaching the end of the rod portion to another part or structure, the end of the rod portion commonly includes a mating feature. There are four common styles of the mating features for the end of the rod portion. The four common styles include a small male threaded end, a larger male threaded end, a female threaded end, and a flanged coupler. The flanged coupler style includes an annular groove that is machined into the cylindrical outer surface of the rod portion at a location near the end. The groove receives a snap ring that functions to connect the end of the rod portion to a female member of another part having an internal groove. The flanged coupler style is common in industries such as, for example, the die casting industry.

It is not uncommon for the mating feature of the rod portion to break, particularly when the mating feature is of the small male threaded end or the flanged coupler style. Stresses often concentrate at reduced diameter sections of the end of the rod portion. For example, in the flanged coupler style, stresses often concentrate at a corner of base and a radial shoulder that define the annular groove. The flanged coupler commonly breaks when the cylinder is pulling a load and the snap ring is concentrating the stresses of the load against the radial shoulder. When the mating feature of the rod portion breaks, the entire piston/rod assembly of the cylinder must be replaced. Replacing the piston/rod assembly commonly requires removal and complete disassembly of the cylinder. Such a repair is time consuming and is very costly. A cylinder having a design that would reduce these costly repairs is desirable.

SUMMARY OF THE INVENTION

According to one embodiment, the present invention relates to a cylinder comprising a cylinder body defining a cylinder bore. End caps close opposite ends of the cylinder body. The cylinder includes a piston/rod assembly that includes a piston portion and a rod portion. The piston portion is located in the cylinder bore and the rod portion extends outwardly of the cylinder body through at least one of the end caps and terminates at an end having a first interlocking member. The cylinder also includes an attachment member having opposite first and second ends. The first end of the attachment member has a second interlocking member for cooperating with the first interlocking member for attaching the attachment member to the end of the rod portion. The second end of the attachment member includes a mating feature for connecting the attachment member and thus, the rod portion to another part.

BRIEF DESCRIPTION OF THE DRAWINGS

Embodiments of this invention will now be described in further detail with reference to the accompanying drawings, in which:

FIG. 1 is a disassembled, partial sectional view of a cylinder constructed in accordance with the present invention;

FIG. 2 is a view taken along line 2-2 in FIG. 1;

FIG. 3 is a sectional view illustrating the attachment portion attached to an end of a rod portion;

FIG. 4 is an enlarged view of a portion of FIG. 3; and

FIG. 5 is an enlarged view of a portion of an alternatively embodiment of the cylinder.

DETAILED DESCRIPTION OF THE INVENTION

FIG. 1 is a disassembled, partial sectional view of a cylinder 10 constructed in accordance with the present invention. The cylinder 10 of FIG. 1 is a hydraulic cylinder and includes a cylinder body 12 that is closed on opposite ends by end caps 14 and 16. Although described with reference to a hydraulic cylinder, the cylinder of the present invention may be a pneumatic cylinder or any other type of cylinder, such as an electromechanical cylinder. FIG. 1 further illustrates tie rods 20 for securing the end caps 14 and 16 to the cylinder body 12. Those skilled in the art should recognize that the cylinder 10 need not include tie rods 20.

The cylinder 10 also includes a piston/rod assembly 22. The piston/rod assembly 22 includes a rod portion 24 and a piston portion 26. The piston portion 26 of the piston/rod assembly 22 separates a cylinder bore 28 into two chambers 32 and 34 located within the cylinder body 12. The rod portion 24 of the piston/rod assembly 22 is affixed to the piston portion 26. FIG. 1 illustrates the rod portion 24 extending outwardly of the cylinder body 12 and through end cap 14 before terminating at end 36 a spaced distance from end cap 14. In other embodiments of the invention, the rod portion 24 may extend outwardly of the cylinder body 12 through both end caps 14 and 16. An interlocking member is located at the end 36 of the rod portion 24 of the piston/rod assembly 22. The interlocking member illustrated in FIG. 1 is a threaded female connection 30.

FIG. 1 also illustrates an attachment member 38 of the cylinder 10. The attachment member 38 includes opposite first and second ends 40 and 42, respectively. An interlocking member is located on the first end 40 of the attachment member 38. The interlocking member of the attachment member 38 is design to cooperate with the interlocking member of the rod portion 24 for attaching the attachment member 38 to the rod portion 24. FIG. 1 illustrates the interlocking member of the attachment member 38 as being a threaded male connection 44 that is sized to be threadedly received in the female connection 30 of the rod portion 24. The male connection 44 terminates at an annular shoulder 48 that extends generally perpendicular to an axis of the male connection 44 to connect to an outer cylindrical surface 46 of the attachment member 38. An annular groove 50 is machined into the male connection 44 a short distance from the shoulder 48 and between the threads and the shoulder 48.

The second end 42 of the attachment member 38 includes a mating feature for connecting to another part such as, for example, a portion of a die casting machine. The mating feature illustrated in FIG. 1 is a flanged attachment 52. The flanged attachment 52 includes a knobbed portion 54 located between the end 42 and an annular groove 56. The annular groove 56 extends into the cylindrical outer surface 46 a short distance from the second end 42.

FIG. 2 illustrates a view taken along line 2-2 of FIG. 1. FIG. 2 illustrates the rod portion 24 extending through the end cap 14. The threaded female connection 30 is also visible in FIG. 2. The outer surface of the rod portion 24, in a location radially outside of the threaded female connection 30 adjacent end 36, includes diametrically opposite wrench flats 70. Alternatively, or in addition to those on the rod portion 24, the attachment member 38 also may include wrench flats.

The attachment member 38 is threadedly connected to the end 36 of the rod portion 24 by threading the male connection 44 into the female connection 30. FIG. 3 illustrates the male connection 44 of the attachment member 38 threadedly received in the female connection 30 of the rod portion 24. When the male connection 44 is received in the female connection 30, the end 36 of the rod portion 24 abuts the shoulder 48 of the attachment member 38.

FIG. 4 is an enlarged portion of FIG. 3. As shown in FIG. 4, the rod portion 24 includes a radially extending threaded hole 76 that extends through one of the wrench flats 70 in a location near the end 36 of the rod portion. A similar radially extending threaded hole may be located on the diametrically opposite wrench flat 70. When the male connection 44 of the attachment member 38 is received in the female connection 30 of the rod portion 24, the annular groove 50 of the male connection 44 aligns with the radially extending threaded hole 76. A set screw 80 is threadedly received in the radially extending threaded hole 76 and seats in the annular groove 50 for helping to lock the attachment member 38 relative to the rod portion 24. The set screw 80 includes a tool receiving portion 82 for enabling use of a tool in inserting, or removing, the set screw 80 in the radially extending threaded hole 76. As an alternative to the set screw 80, other locking means such as an adhesive or keeper ring may be used for helping to lock the attachment member 38 to the rod portion 24.

When the cylinder 10 is mated with another part, such as, for example, a part of a die cast machine, the knobbed portion 54 of the flanged attachment 52 is inserted into a corresponding female member of the other part and a snap ring (not shown), to be located in groove 56, locks the attachment member 38 and, thus, the rod portion 24 to the other part. The flanged attachment member 52 is subject to breakage at the base of the groove 56, typically adjacent to the knobbed portion 54. The attachment member 38 is designed so that the mating feature, here the flanged attachment 52, breaks prior to a breakage of the rod portion 24. When the flanged attachment 52 breaks, the attachment member 38 is the only part of the cylinder 10 that needs to be replaced. This results in significantly less work and less cost that replacing the entire piston/rod assembly as is necessary with current cylinder designs. To replace the attachment member 38, the set screw 80 is removed using an Allen wrench, a screwdriver or other suitable tool. A wrench is then secured to the wrench flats 70 of the rod portion 24 and the attachment member 38 is unscrewed or unthreaded from the rod portion 24. A new attachment member 38 then is attached to the rod portion 24 and locked in place with the set screw 80 or other means.

FIG. 5 illustrates an enlarged portion of an alternative embodiment of the present invention. The enlarged portion of FIG. 5 is similar to the portion illustrated in FIG. 4 and, therefore, like reference numbers are used to represent structures that are the same or similar to those shown in FIG. 4. In FIG. 5, the interlocking member of the rod portion 24 are surfaces that define an annular groove 84 in a cylindrical surface of a blind hole of the rod portion 24. The interlocking member of the attachment member 38 are surfaces that define an annular groove 86 in a reduced diameter portion 92 of the attachment member 38. A locking ring 88, such as a snap ring, is located in the grooves 84 and 86 for attaching the attachment member 38 to the rod portion 24. FIG. 5 also illustrates an insulating material 90 interposed between the attachment member 38 and the rod portion 24 for preventing the migration of heat through the attachment member and to the rod portion. Thus, when the attachment member 38 is affixed to a part subjected to high levels of heat, the heat is prevented from migrating through the attachment member 38 to the rod portion 24 and into the cylinder body 12. Also, the attachment member 38 and the rod portion 24 may be formed of different materials for best suiting the particular application of the cylinder. The different materials also could reduce heat transfer into the cylinder body 12. For example, the attachment member may be formed from a high strength material having a low thermal conductivity so that heat is not transferred through the attachment member to the rod portion. Alternatively, the attachment member may be formed of a material having a low electrical conductivity to help prevent an electric charge from being transferred to the rod portion.

Although the cylinder 10 of FIGS. 1-4 has been described with the rod portion 24 having the female connection 30 and the attachment member 38 having the male connection 44, those skill in the art, after reference to this disclosure, will recognize that the male connection may be located on the rod portion 24 and the female connection on the attachment member 38. Additionally, other types of interlocking members may be used for attaching the attachment member 38 to the rod portion 24. Furthermore, the mating feature on the second end of the attachment member 38 may be any style of mating feature and is not limited to the flanged attachment 52 illustrated in the drawings. When another style of mating feature is used on the second end of the attachment member 38, the mating feature, or some other portion of the attachment member 38, should be designed to break prior to any breakage of the rod portion 24 of the piston/rod assembly 22.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention.

What is claimed is:
1. A cylinder comprising:
a cylinder body defining a cylinder bore;
end caps for closing opposite ends of the cylinder body;
a piston/rod assembly including a piston portion and a rod portion, the piston portion being located in the cylinder bore and the rod portion extending outwardly of the cylinder body through at least one of the end caps and terminating at an end having a first interlocking member; and an attachment member having opposite first and second ends, the first end of the attachment member having a second interlocking member for cooperating with the first interlocking member for attaching the attachment member to the end of the rod portion, the second end of the attachment member including a mating feature for connecting the attachment member and thus, the rod portion to another part;

wherein one of the first and second interlocking members is a threaded male member and the other of the first and second interlocking members is a threaded female member that is adapted to threadedly receive the male member for connecting the attachment member to the rod portion, and wherein the male member includes an annular groove and the female member includes a radially extending through hole, a set screw adapted to be received in the radially extending through hole and seating in the annular groove for helping to secure the attachment member to the rod portion.

2. The cylinder of claim 1 wherein the annular groove of the male member is located between threads and an annular shoulder of the male member.

3. The cylinder of claim 1 wherein the mating feature includes surfaces defining an annular groove that extends into a cylindrical outer surface of the attachment member and a knobbed portion at an end of the attachment member, the annular groove adapted to receive a locking ring for attaching the knobbed portion of the attachment member to another part.

4. The cylinder of claim 1 wherein at least one of the rod portion and the attachment member include wrench flats for receiving a wrench.

5. The cylinder of claim 1 wherein the first interlocking member is the threaded female member and the second interlocking member is the threaded male member sized for being threadedly connected to the female member for connecting the attachment member to the rod portion.

6. The cylinder of claim 1 wherein the rod portion and the attachment member are formed from different materials.

7. The cylinder of claim 1 wherein an insulating material is interposed between the rod portion and the attachment member, the insulating material acting to prevent a migration of heat between the rod portion and the attachment member.

8. The cylinder of claim 7 wherein the first and second interlocking members include surfaces defining grooves, a locking ring adapted to be received in the grooves for attaching the attachment member to the rod portion.

9. The cylinder of claim 7 wherein the rod portion and the attachment member are formed from different materials.

10. A cylinder comprising:
a cylinder body defining a cylinder bore;
end caps for closing opposite ends of the cylinder body;
a piston/rod assembly including a piston portion and a rod portion, the piston portion being located in the cylinder bore and the rod portion extending outwardly of the cylinder body through at least one of the end caps and terminating at an end having a first interlocking member; and
an attachment member having opposite first and second ends, the first end of the attachment member having a second interlocking member for cooperating with the first interlocking member for attaching the attachment member to the end of the rod portion, the second end of the attachment member including a mating feature for connecting the attachment member and thus, the rod portion to another part;
wherein at least one of the rod portion and the attachment member include wrench flats for receiving a wrench; and
wherein a radially extending through hole extends through one of the wrench flats, a set screw adapted to be received in the radially extending through hole for helping to secure the attachment member to the rod portion.

11. A cylinder comprising:
a cylinder body defining a cylinder bore;
end caps for closing opposite ends of the cylinder body;
a piston/rod assembly including a piston portion and a rod portion, the piston portion being located in the cylinder bore and the rod portion extending outwardly of the cylinder body through at least one of the end caps and terminating at an end having a first interlocking member; and
an attachment member having opposite first and second ends, the first end of the attachment member having a second interlocking member for cooperating with the first interlocking member for attaching the attachment member to the end of the rod portion, the second end of the attachment member including a mating feature for connecting the attachment member and thus, the rod portion to another part;
wherein a portion of the attachment member is configured to break prior to any breakage of the rod portion.

12. The cylinder of claim 11 wherein the portion of the attachment member designed to break prior to any breakage of the rod portion is the mating feature.

\* \* \* \* \*